US012162126B2

(12) United States Patent
Shioya et al.

(10) Patent No.: US 12,162,126 B2
(45) Date of Patent: Dec. 10, 2024

(54) WORKING TOOL

(71) Applicant: Koki Holdings Co., Ltd., Tokyo (JP)

(72) Inventors: Koji Shioya, Ibaraki (JP); Takashi Ueda, Ibaraki (JP); Shota Ueno, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 14 days.

(21) Appl. No.: 18/254,269

(22) PCT Filed: Oct. 29, 2021

(86) PCT No.: PCT/JP2021/039957
§ 371 (c)(1),
(2) Date: May 24, 2023

(87) PCT Pub. No.: WO2022/113643
PCT Pub. Date: Jun. 2, 2022

(65) Prior Publication Data
US 2024/0017389 A1 Jan. 18, 2024

(30) Foreign Application Priority Data
Nov. 26, 2020 (JP) ................................ 2020-195921

(51) Int. Cl.
*B25C 7/00* (2006.01)
*B25C 1/04* (2006.01)

(52) U.S. Cl.
CPC ................ *B25C 7/00* (2013.01); *B25C 1/047* (2013.01)

(58) Field of Classification Search
CPC ........................................................ B25C 7/00
See application file for complete search history.

(56) References Cited

U.S. PATENT DOCUMENTS 5,238,167 A * 8/1993 Howard .................... B25C 7/00 227/119
5,452,835 A * 9/1995 Shkolnikov ............. B25C 1/047 227/119
(Continued)

FOREIGN PATENT DOCUMENTS

JP 4420205 B2 2/2010
JP 2014-028426 A 2/2014
(Continued)

OTHER PUBLICATIONS

International Search Report issued in corresponding International Application No. PCT/JP2021/039957, dated Jan. 11, 2022 w/ English Translation (4 pages).

*Primary Examiner* — Nathaniel C Chukwurah
(74) *Attorney, Agent, or Firm* — Rimon P.C.

(57) ABSTRACT

A working tool with further improved fastener driving accuracy is realized. A driving tool includes a driver blade configured to strike a fastener and drive it into a driving surface, a blade guide configured to form an ejection path through which the fastener struck by the driver blade passes, and a probe that is movable in a top-bottom direction and contacts to the fastener ejected from the ejection path to guide the fastener. The blade guide is provided with a limiting portion configured to limit an upward movement amount of the probe such that the probe does not reach a predetermined position when the probe moves upward in a state in which a striking direction of the fastener is inclined by a predetermined angle or more with respect to the driving surface.

8 Claims, 16 Drawing Sheets

(56) References Cited

U.S. PATENT DOCUMENTS

| | | | | |
|---|---|---|---|---|
| 7,628,304 | B2 * | 12/2009 | Yamamoto | B25C 7/00 227/119 |
| 2003/0218044 | A1 * | 11/2003 | Laubach | B25C 5/1658 227/120 |
| 2008/0277446 | A1 * | 11/2008 | Yamamoto | B25C 1/041 227/139 |
| 2009/0236386 | A1 * | 9/2009 | Wang | B25C 7/00 227/8 |
| 2014/0158739 | A1 | 6/2014 | Grazioli et al. | |
| 2017/0120432 | A1 * | 5/2017 | Brendel | B25C 1/06 |
| 2017/0259417 | A1 | 9/2017 | Kondou | |
| 2019/0168368 | A1 * | 6/2019 | Fan | B25C 1/047 |
| 2019/0337136 | A1 * | 11/2019 | Hays | B25C 1/06 |

FOREIGN PATENT DOCUMENTS

| | | | |
|---|---|---|---|
| JP | 2017-159436 | A | 9/2017 |
| JP | 2019-098451 | A | 6/2019 |

* cited by examiner

1A: DRIVING TOOL
30: BLADE GUIDE
35: LIMITING PORTION
60: PROBE

WORKING TOOL

TECHNICAL FIELD

The present invention relates to a working tool and particularly relates to a working tool suitable for a driving work of driving a fastener into a workpiece.

BACKGROUND ART

Today, various types of working tools have been developed and put into practical use. There are a wide variety of works carried out by using working tools, and one of them is a driving work. Furthermore, a fitting fixing work is one example of the driving work carried out by using a working tool. In the fitting fixing work, a fitting is fixed to a workpiece by driving a fastener into a hole, which is provided in the fitting placed on the workpiece, by using a working tool.

RELATED ART DOCUMENT

Patent Document

Patent Document 1: Japanese Unexamined Patent Application Publication No. 2019-098451

SUMMARY OF THE INVENTION

Problems to be Solved by the Invention

If the driving work is carried out in a state in which a working tool is inclined with respect to a workpiece or the like, driving failure sometimes occurs. For example, in the fitting fixing work described above, if the working tool is inclined with respect to the fitting, the fastener comes off from the hole of the fitting, and the fitting is not normally fixed in some cases.

An object of the present invention is to provide a working tool with further improved fastener driving accuracy.

Means for Solving the Problems

A working tool according to the present invention includes a striking portion configured to strike a fastener in a first direction and drive it into a driving surface, an ejection portion configured to form an ejection path through which the fastener struck by the striking portion passes, and a contacting member that is movable with respect to the ejection portion in the first direction and a second direction opposite to the first direction and contacts to the fastener ejected from the ejection path to guide the fastener. The striking portion is allowed to strike the fastener when the contacting member moving in the second direction reaches a predetermined position. The contacting member is movable at least between the predetermined position and a projecting position that is apart from the predetermined position in the first direction and projects from the ejection portion. The ejection portion is provided with a limiting portion configured to limit a movement amount of the contacting member in the second direction such that the contacting member does not reach the predetermined position when the contacting member moves in the second direction in a state in which the first direction is inclined by a predetermined angle or more with respect to the driving surface.

Effects of the Invention

According to the present invention, a working tool with further improved fastener driving accuracy is realized.

BRIEF DESCRIPTIONS OF THE DRAWINGS

Figure 15:
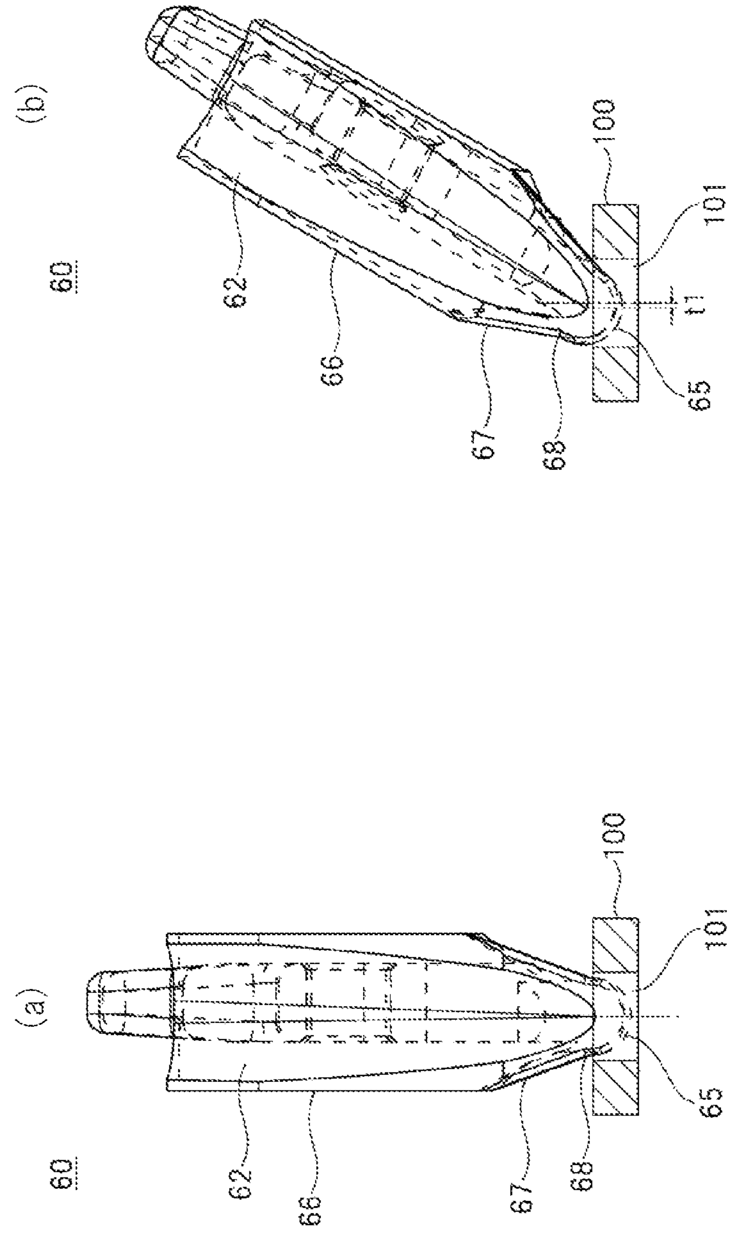

FIG. 15(*a*) and FIG. 15(*b*) are enlarged views of a probe; and

Figure 16:
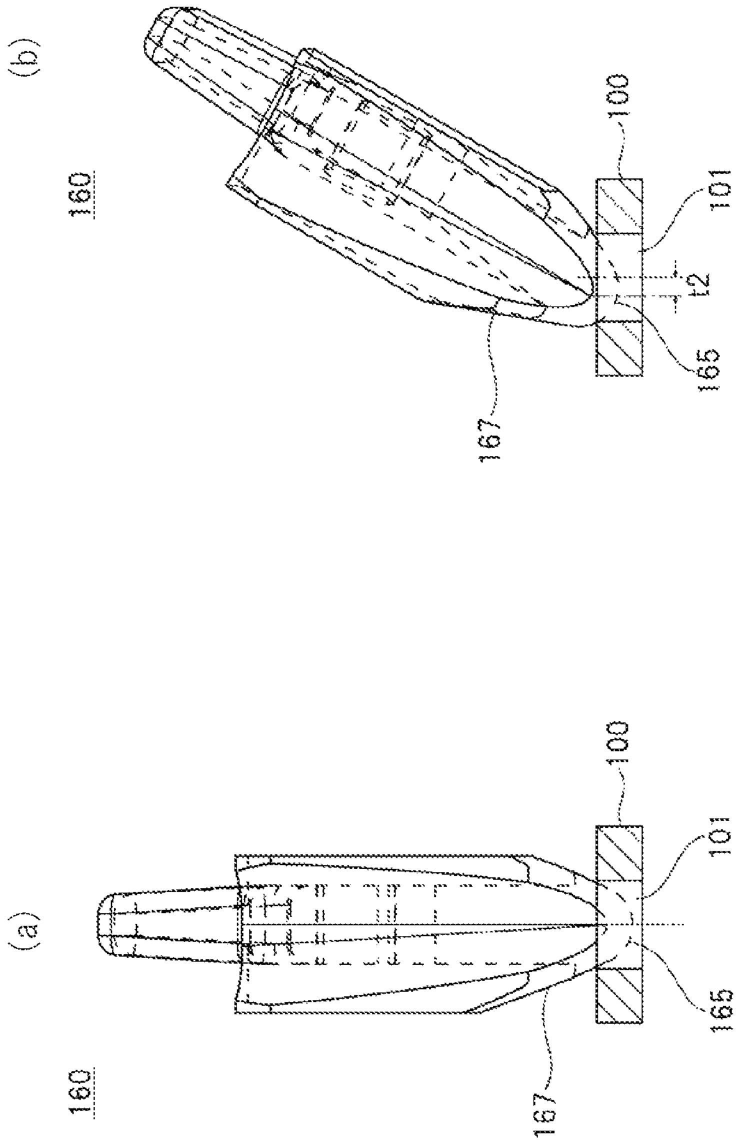

FIG. 16(*a*) and FIG. 16(*b*) are enlarged views of a conventional probe.

DETAILED DESCRIPTION OF PREFERRED EMBODIMENTS

Figure 1:
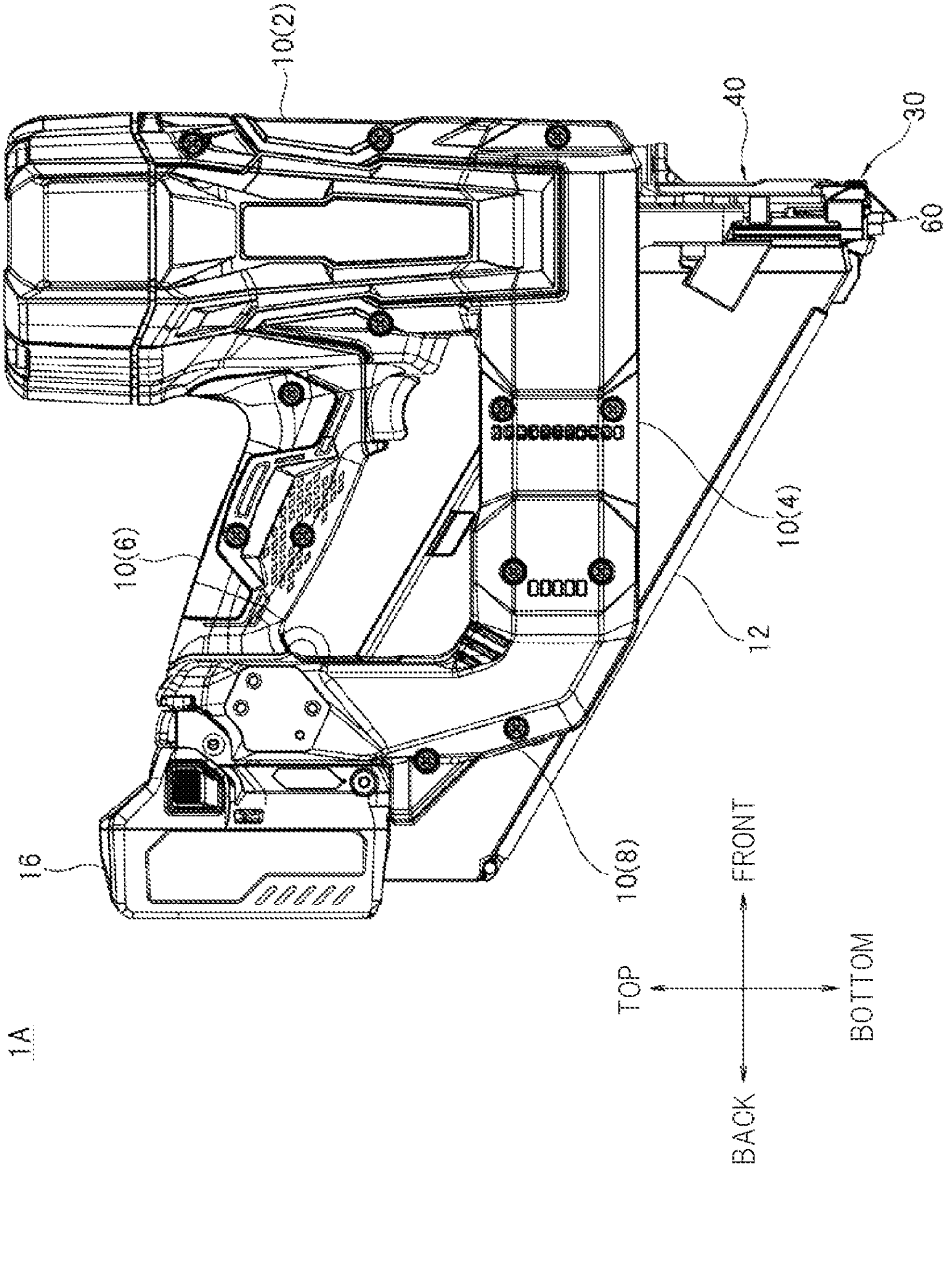
FIG. 1 is a side view of a driving tool.
Figure 2:
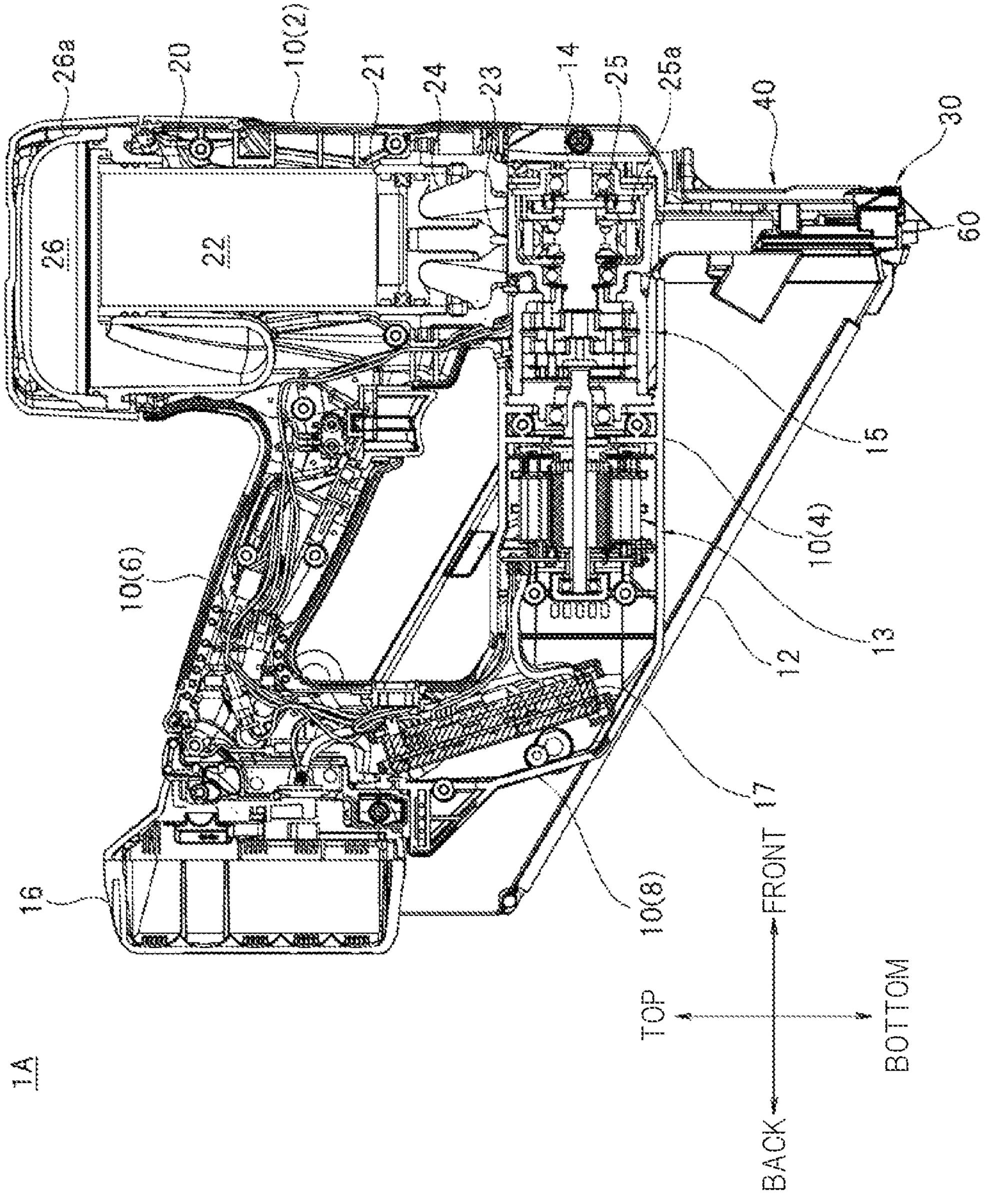
FIG. 2 is a longitudinal cross-sectional view of the driving tool.

Hereinafter, an embodiment of the present invention will be described in detail with reference to drawings. FIG. 1 is a side view illustrating external appearance of a working tool according to the present embodiment. FIG. 2 is a longitudinal cross-sectional view illustrating a structure of the working tool according to the present embodiment. The working tool illustrated in FIG. 1 and FIG. 2 is a driving tool suitable for the driving work of driving a fastener such as a nail into a workpiece such as a plate or a gypsum board.

As illustrated in FIG. 1, a driving tool 1A includes a cylinder case 2, a motor case 4, and a handle 6. One end sides of the motor case 4 and the handle 6 are connected to the cylinder case 2, and the other end sides of the motor case 4 and the handle 6 are connected to a coupling portion 8. In other words, the one end sides of the motor case 4 and the handle 6 are connected to each other via the cylinder case 2, and the other end sides of the motor case 4 and the handle 6 are connected to each other via the coupling portion 8. Namely, the cylinder case 2, the motor case 4, the handle 6, and the coupling portion 8 are integrated. Therefore, in the following description, the cylinder case 2, the motor case 4, the handle 6, and the coupling portion 8 are collectively referred to as a "housing 10".

The housing 10 is composed of two housing members formed of a synthetic resin such as nylon or polycarbonate. Specifically, the two housing members butted to each other form the housing 10 including the cylinder case 2, the motor case 4, the handle 6, and the coupling portion 8.

Herein, a longitudinal direction of the cylinder case 2 is defined as a "top-bottom direction", and a longitudinal direction of the motor case 4 is defined as a "front-back direction". Also, the direction orthogonal to the top-bottom direction and the front-back direction is defined as a "left-right direction". As a matter of course, these definitions are merely the definitions for convenience of description.

According to the above-described definitions, the motor case 4 is located below the handle 6 and extends backward from the cylinder case 2. On the other hand, the handle 6 is located above the motor case 4 and extends obliquely upward and backward from the cylinder case 2.

As illustrated in FIG. 2, a cylinder 20 is housed in the cylinder case 2, and a piston 21 is housed in the cylinder 20. The piston 21 housed in the cylinder 20 reciprocates in an axial direction (top-bottom direction) of the cylinder 20 in the cylinder 20. In the cylinder 20, a piston upper chamber 22 is formed by an inner circumferential surface of the cylinder 20 and an upper surface of the piston 21. The volume of the piston upper chamber 22 is increased and reduced along with the reciprocation (vertical movement) of the piston 21. Specifically, the volume of the piston upper chamber 22 is minimum when the piston 21 is at the top dead center, and is maximum when the piston 21 is at the bottom dead center. Note that the piston 21 illustrated in FIG. 2 is at the bottom dead center.

A driver blade 23 is coupled to a lower surface of the piston 21. The driver blade 23 is integrated with the piston 21 and reciprocates (vertically moves) together with the piston 21. The driver blade 23 collides with the fastener and strikes the fastener while moving downward. Namely, the driver blade 23 corresponds to a striking portion of the present invention. Also, the downward direction in the present embodiment matches the direction of striking the fastener by the driver blade 23 and corresponds to a first direction of the present invention. Thus, the upward direction which is the opposite direction of the downward direction in the present embodiment corresponds to a second direction of the present invention.

At the bottom of the cylinder 20, a damper 24 made of rubber or urethane is provided. The damper 24 receives the piston 21 which has reached the bottom dead center and prevents the collision between the piston 21 and the cylinder 20. The driver blade 23 extending downward from the piston 21 penetrates through the damper 24 and the cylinder 20 and projects downward from the cylinder 20.

Note that, in the present embodiment, the piston 21 and the driver blade 23 which have been formed separately are coupled and integrated, but the piston 21 and the driver blade 23 may be integrally formed.

As illustrated in FIG. 1 and FIG. 2, a magazine 12 is attached to a side portion of the housing 10. On the other hand, an ejection path 31 described later is provided below the cylinder case 2. The magazine 12 can house a plurality of fasteners and is provided with a supply mechanism configured to supply the plurality of housed fasteners one by one to the ejection path 31.

Figure 3:
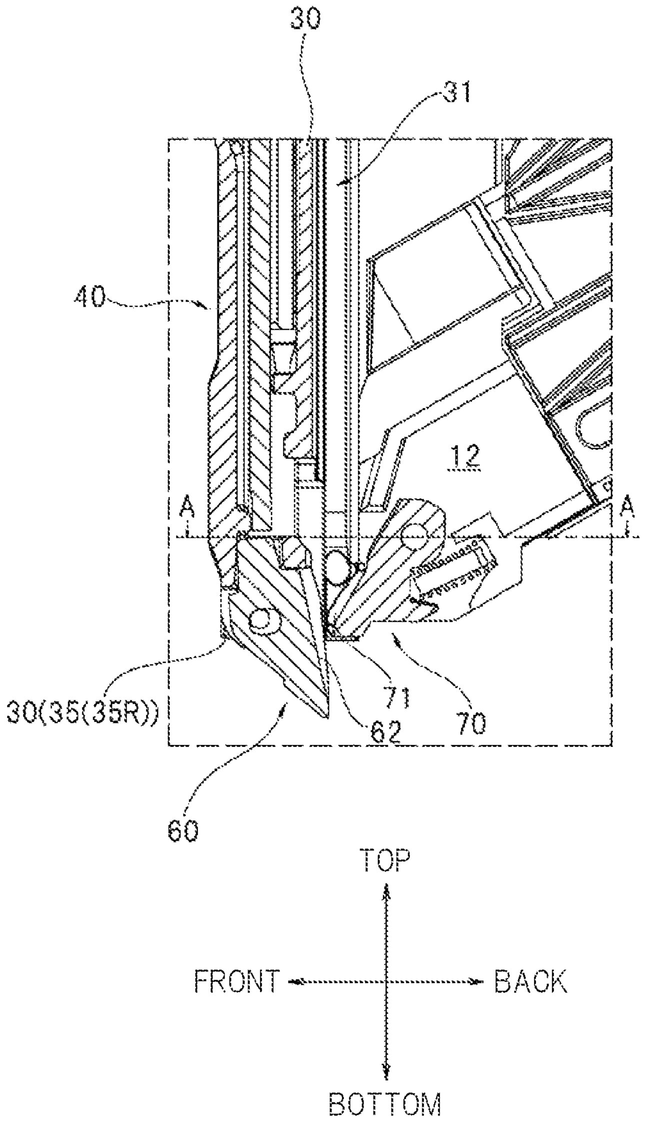
FIG. 3 is a longitudinal cross-sectional view illustrating an ejection path and the structure in the vicinity of it.
Figure 4:
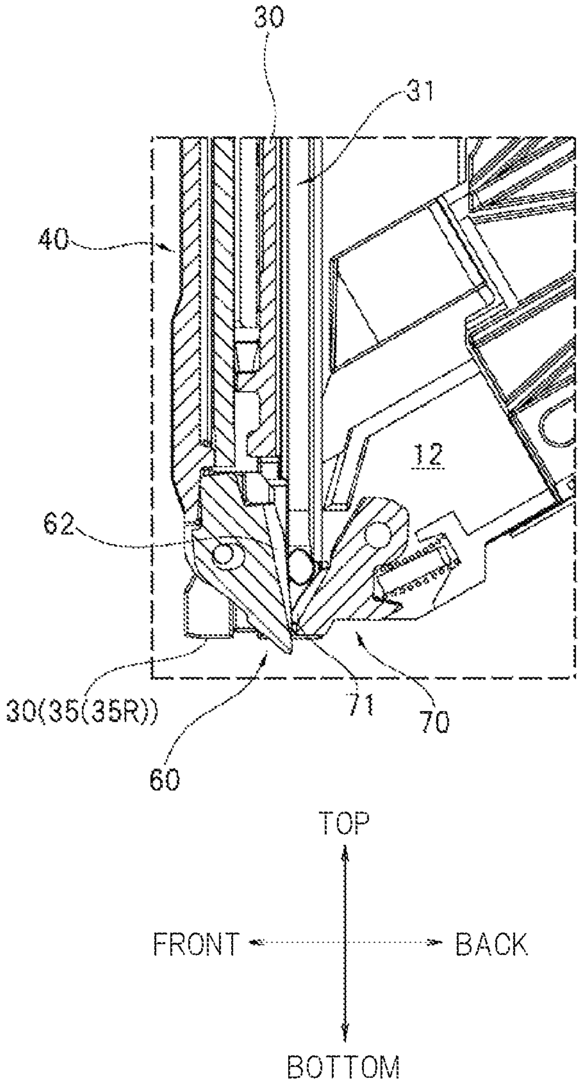
FIG. 4 is another longitudinal cross-sectional view illustrating the ejection path and the structure in the vicinity of it.
Figure 5:
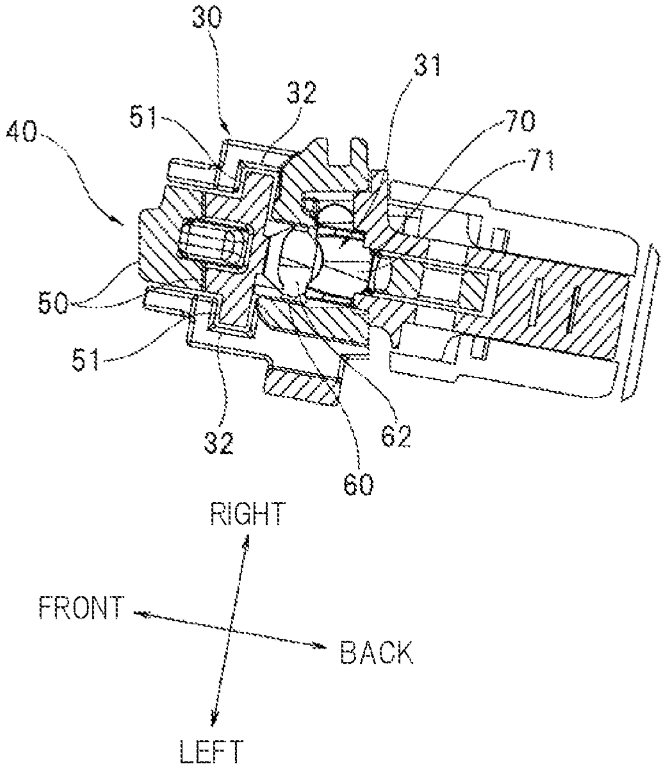
FIG. 5 is a transverse cross-sectional view along a line A-A in FIG. 3.

FIG. 3 and FIG. 4 are longitudinal cross-sectional views (vertical cross-sectional views) illustrating the ejection path 31 and the structure in the vicinity of it. FIG. 5 is a transverse cross-sectional view (horizontal cross-sectional view) along a line A-A in FIG. 3. As illustrated in these drawings, the ejection path 31 is formed by a plurality of members (ejection path forming members) including a first blade guide 30 extending downward from the cylinder case 2. The ejection path forming members include, other than the first blade guide 30, a second blade guide which is provided in the magazine 12 and paired with the first blade guide 30 and a nose which is disposed above the first blade guide 30 and the second blade guide.

The driver blade 23 illustrated in FIG. 2 strikes the fastener fed to the ejection path 31 formed by the ejection path forming members including the first blade guide 30. More specifically, the driver blade 23 strikes a head of the fastener fed to the ejection path 31 illustrated in FIG. 3 and others. The fastener struck by the driver blade 23 passes through the ejection path 31 and is ejected from the ejection path 31. The first blade guide 30 which is a member forming the ejection path 31 corresponds to an ejection portion of the present invention. In the following description, the first blade guide 30 may be abbreviated as a "blade guide 30".

A pinwheel 25 which moves the piston 21 illustrated in FIG. 2 from the bottom dead center side toward the top dead center side is provided. The pinwheel 25 is fixed to a drive shaft 14 rotationally driven by a motor 13. On the pinwheel 25, plural pins **25*a* are provided at predetermined intervals along a circumferential direction (rotation direction). On the other hand, on the driver blade 23**, plural racks are provided at predetermined intervals along the axial direction (top-bottom direction).

The rotary driving force output from the motor 13 housed in the motor case 4 is transmitted to the drive shaft 14, to which the pinwheel 25 is attached, via a speed reduction mechanism 15 of a planetary gear type. The motor 13 is an electric brushless motor which operates with the electric power supplied from a battery 16 attached to a rear part of the housing (back surface of the coupling portion 8). A controller 17 as a control unit is built in the coupling portion 8. The controller 17 is a microcomputer composed of a CPU, a ROM, a RAM, and the like and controls the start/stop, rotation number, rotation speed, and others of the motor 13 in accordance with predetermined conditions.

A chamber **26*a* which forms an accumulation chamber 26 is provided above the cylinder 20. The accumulation chamber 26 communicates with the piston upper chamber 22. The diameter of the chamber 26*a* of the present embodiment is larger than the diameter of the cylinder 20. In the present embodiment in which the chamber 26*a* has a larger diameter than the cylinder 20, a required volume of the accumulation chamber 26 is ensured while the total height of the driving tool 1A including the cylinder and the chamber 26*a*** is kept low.

The piston upper chamber 22 and the accumulation chamber 26 are filled with a high-pressure gas (in the present embodiment, compressed air). When the piston 21 is moved from the bottom dead center side toward the top dead center side (when the piston 21 is elevated), the motor 13 rotates forward under the control of the controller 17. When the motor 13 rotates forward, the pinwheel 25 rotates in a predetermined direction. In this case, it is assumed that, when the motor 13 rotates forward, the pinwheel 25 rotates in the counterclockwise direction when viewed from the front side.

When the pinwheel 25 starts rotating in the counterclockwise direction, the plural pins **25*a* provided on the pinwheel 25 are sequentially engaged with the plural racks provided on the driver blade 23. Then, when the pinwheel 25 rotates until the pin 25*a* on the most downstream side in the rotation direction is engaged with the lowermost rack in the top-bottom direction, the piston 21** is pushed up to the top dead center.

In the process in which the piston 21 is pushed up in the above-described manner, the compressed air in the piston upper chamber 22 is fed to the accumulation chamber 26 and is further compressed. Thereafter, when the pinwheel 25 further rotates, the pins 25*a* provided on the pinwheel 25 and the racks provided on the driver blade 23 are disengaged from each other. Then, the piston 21 is moved from the top dead center toward the bottom dead center by the pressure (air pressure) of the compressed air in the piston upper chamber 22 and the accumulation chamber 26, and the driver blade 23 is moved downward. Namely, the piston 21 and the driver blade 23 descend.

Figure 6:
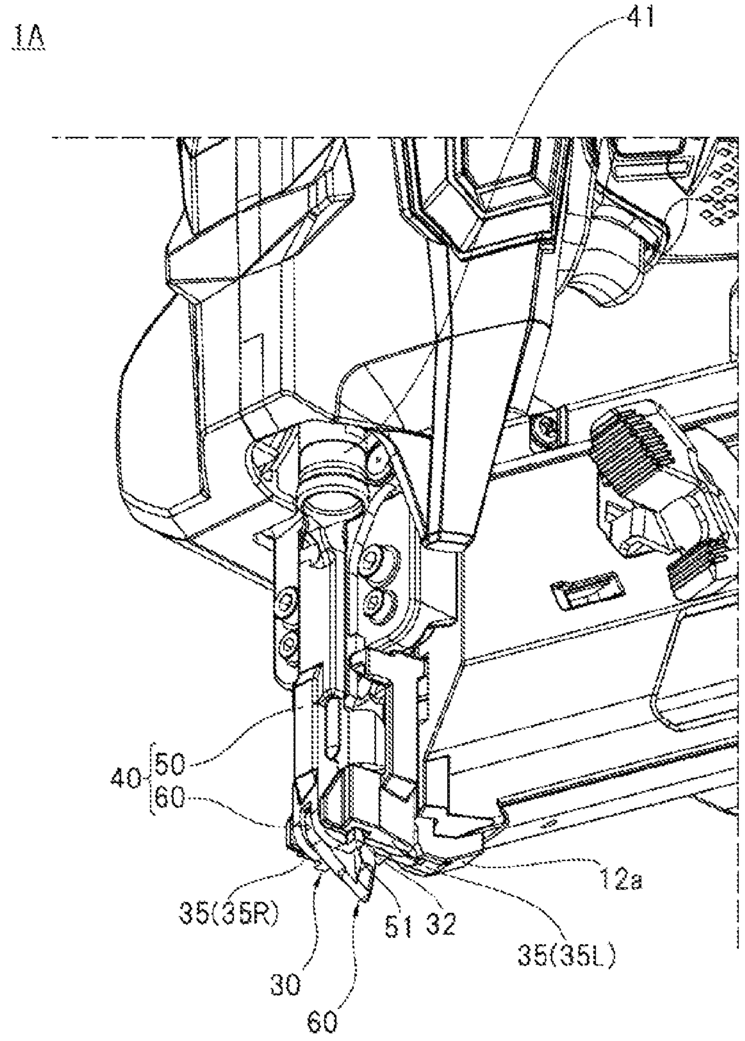
FIG. 6 is a perspective view illustrating a blade guide and its vicinity.

Refer to FIG. 6. FIG. 6 is a perspective view illustrating the blade guide 30 and its vicinity. The driving tool 1A is provided with a push lever 40 which is movable in the downward direction (first direction) and the upward direction (second direction) with respect to the blade guide 30. From another perspective, the push lever 40 is retained by the blade guide 30 and others so as to be vertically movable.

Figure 7:
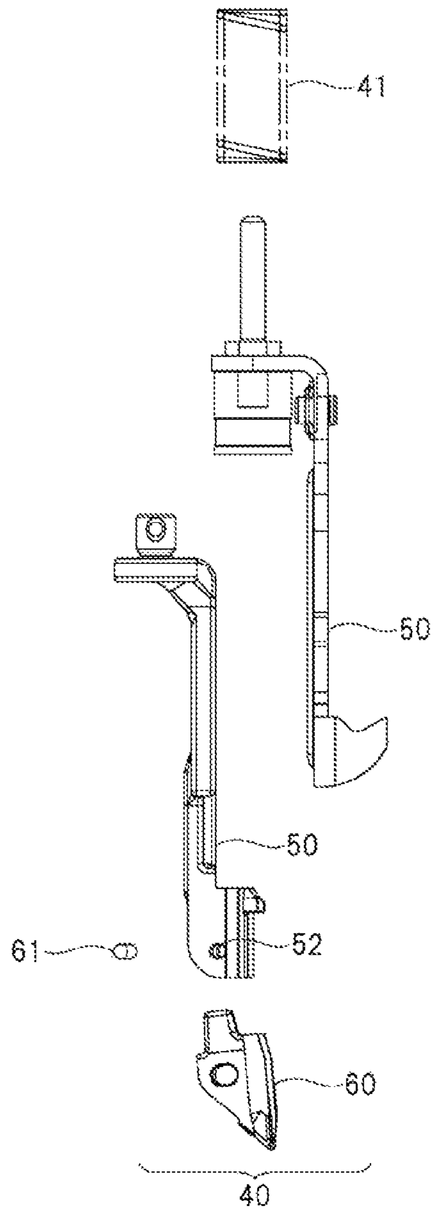
FIG. 7 is a developed view of a push lever.

FIG. 7 is a developed view (exploded view) of the push lever 40. The push lever 40 is composed of a push-lever main body 50 and a probe 60 which is provided at a downward end (lower end) of the push-lever main body 50. In the following description, the push-lever main body 50 may be abbreviated as a "lever main body 50".

As illustrated in FIG. 5 and FIG. 6, guide grooves 32 are formed respectively on two opposed inner surfaces of the blade guide 30. On the other hand, guide projections 51 are formed respectively on two outer surfaces of the lever main body 50. The lever main body 50 is disposed inside the blade guide 30 (between the two opposed inner surfaces). Furthermore, the guide projections 51 formed on the outer surfaces of the lever main body 50 are fitted in the guide grooves 32 formed on the inner surfaces of the blade guide 30. As a result, the push lever 40 (the lever main body 50 and the probe 60) are vertically movable with respect to the blade guide 30.

As illustrated in FIG. 7, both ends of a coupling pin 61 which penetrates through the probe 60 in the left-right direction are fitted in a coupling hole 52 provided at a lower end of the lever main body 50. As a result, the probe 60 is vertically movable integrally with the lever main body 50 and is also rotatable within a predetermined range with respect to the lever main body 50 around the coupling pin 61 as a rotation shaft.

The probe 60 which is a part of the push lever 40 contacts to the fastener, which is ejected from the ejection path 31 formed by the blade guide 30 and the like, and guides the fastener. As illustrated in FIG. 3, FIG. 4, and FIG. 5, the probe 60 is disposed on one side (front side) of the ejection path 31. On the other hand, a nail guide 70 is disposed on the other side (back side) of the ejection path 31. Namely, the probe 60 and the nail guide 70 are opposed to each other with the ejection path 31 interposed therebetween. The fastener struck by the driver blade 23 (FIG. 2) is ejected through the space between the probe 60 and the nail guide 70. At this time, the fastener contacts to the probe 60 and the nail guide 70 and is guided by them. Normally, the fastener contacts to the nail guide 70 and then contacts to the probe 60. The front surface side (the side facing the probe 60) of the nail guide 70 is hollowed so as to form a concave groove 71 which is gradually narrowed toward a distal end (lower end). On the other hand, the back surface side (the side facing the nail guide 70) of the probe 60 is hollowed so as to form a concave groove 62 which is gradually narrowed toward a distal end (lower end). The fastener is guided toward the probe 60 by the concave groove 71 of the nail guide 70. Then, the fastener contacts to the concave groove 62 of the probe 60 and is ejected along the concave groove 62. In other words, the probe 60 contacts to the fastener which is ejected from the ejection path 31, and guides the fastener. Namely, the probe 60 corresponds to a contacting member of the present invention.

Note that the fastener may contact to the probe 60 and then contact to the nail guide 70. Alternatively, the fastener which has contacted to the probe 60 may contact to the nail guide 70 and then contact to the probe 60 again. However, the fastener contacts to the probe 60 at least once and is guided by the probe 60.

The probe 60 which is a part of the push lever 40 which is movable in the top-bottom direction with respect to the blade guide 30 is movable between a predetermined position and a projecting position which is apart from the predetermined position in the downward direction. Herein, the probe 60 illustrated in FIG. 3 is located at the projecting position, and the probe 60 illustrated in FIG. 4 is located at the predetermined position.

The push lever 40 including the probe 60 is always biased downward by a coil spring 41 (FIG. 6, FIG. 7). Namely, the push lever 40 including the probe 60 is pushed down toward the projecting position lower than the predetermined position by the biasing force by the coil spring 41. On the other hand, when the probe 60 is pressed to a driving surface or a contacting surface which is parallel to the driving surface, the push lever 40 including the probe 60 moves upward against the biasing force of the coil spring 41. Namely, when the probe 60 is pressed to the driving surface or the like, the push lever 40 including the probe 60 is pushed up to the predetermined position which is higher than the projecting position against the biasing force of the coil spring 41. Therefore, in the following description, the projecting position (the position of the probe 60 illustrated in FIG. 3) may be referred to as a "pushed-down position", and the predetermined position (the position of the probe 60 illustrated in FIG. 4) may be referred to as a "pushed-up position".

As illustrated in FIG. 3, when the probe 60 is at least at the pushed-down position, the distal end of the probe 60 projects from a lower end of the blade guide 30. In the present embodiment, as illustrated in FIG. 4, even when the probe 60 is at the pushed-up position, the distal end of the probe 60 slightly projects from the lower end of the blade guide 30.

Note that the probe 60 is required to be movable at least between the pushed-up position and the pushed-down position. Namely, the probe 60 may be able to move downward from the position illustrated in FIG. 3 and may be able to move upward from the position illustrated in FIG. 4.

However, the driver blade 23 illustrated in FIG. 2 is allowed to strike the fastener when the probe 60 reaches the pushed-up position. In other words, the driver blade 23 is not allowed to strike the fastener until the probe 60 which moves upward reaches the pushed-up position. Namely, reaching the pushed-up position of the probe 60 is one of the conditions for the driver blade 23 to perform a driving action. Therefore, the driving tool 1A is provided with a detector 42 configured to detect that the probe 60 has reached the pushed-up position.

Figure 8:
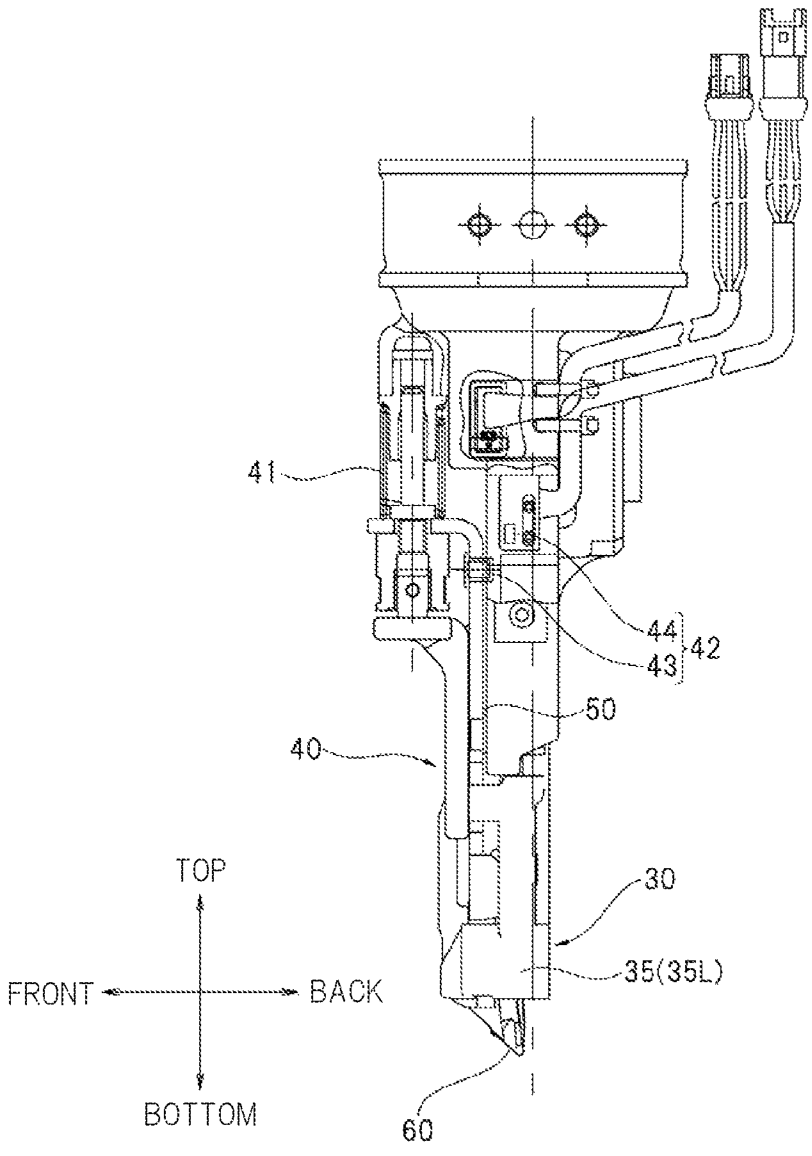
FIG. 8 is an explanatory view illustrating a detector.
Figure 9:
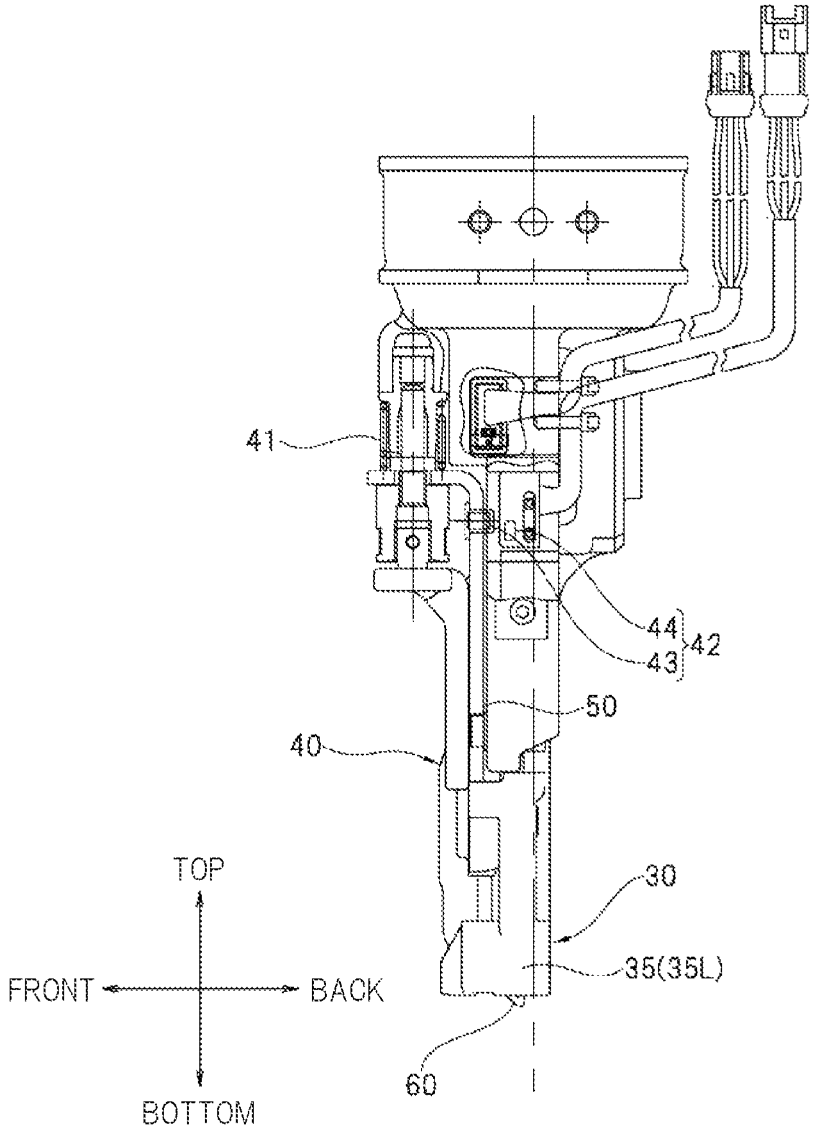
FIG. 9 is another explanatory view illustrating the detector.

The detector 42 in the present embodiment is composed of a magnet 43 attached to the push lever 40 and a magnetic sensor (Hall element 44) that detects the change in magnetic fields caused by the movement of the magnet 43. FIG. 8 is an explanatory view illustrating the positional relationship of the magnet 43 and the Hall element 44 when the probe 60 is at the pushed-down position. FIG. 9 is an explanatory view illustrating the positional relationship of the magnet 43 and the Hall element 44 when the probe 60 is at the pushed-up position.

The detection result of the detector 42 (output of the Hall element 44) illustrated in FIG. 8 and FIG. 9 is input to the controller 17 illustrated in FIG. 2. The controller 17 controls the motor 13 based on the change in the output of the Hall element 44. For example, when the magnet 43 illustrated in FIG. 8 moves to the position illustrated in FIG. 9 (when the magnet gets close to the Hall element 44) as the push lever 40 illustrated in FIG. 8 rises, the output voltage of the Hall element 44 rises. In this case, when the value of the input voltage exceeds a threshold value, the controller 17 determines that the probe 60 has reached the pushed-up position (determines that the probe 60 has risen to the pushed-up position) and actuates the motor 13. In other words, while the value of the input voltage is below the threshold value, the controller 17 determines that the probe 60 has not reached the pushed-up position (determines that the probe 60 has not risen to the pushed-up position) and does not actuate the motor 13.

Alternatively, when the magnet 43 illustrated in FIG. 8 moves to the position illustrated in FIG. 9 (when the magnet gets close to the Hall element 44) as the push lever 40 illustrated in FIG. 8 rises, the output of the Hall element 44 is inverted. In this case, when the output of the Hall element 44 is inverted, the controller 17 determines that the probe 60 has reached the predetermined position (determines that the probe 60 has risen to the pushed-up position) and actuates the motor 13. In other words, until the output of the Hall element 44 is inverted, the controller 17 determines that the probe 60 has not reached the predetermined position (determines that the probe 60 has not risen to the pushed-up position) and does not actuate the motor 13.

As described above, when the upward movement amount (elevation amount) of the probe 60 exceeds a predetermined amount and the probe 60 reaches the predetermined position (pushed-up position), the driver blade 23 is allowed to strike the fastener. More specifically, the driving action is performed if the other conditions are satisfied. In other words, when the upward movement amount (elevation amount) of the probe 60 has not exceeded the predetermined amount and the probe 60 has not reached the predetermined position (pushed-up position), the driver blade 23 is not allowed to strike the fastener. More specifically, the driving action is not performed even if the other conditions are satisfied.

As illustrated in FIG. 6, FIG. 8, and FIG. 9, the blade guide 30 is provided with a limiting portion 35 configured to limit the upward movement amount (elevation amount) of the probe 60. The limiting portion 35 is provided around the probe 60, and limits the upward movement amount of the probe 60 such that the probe 60 does not reach the pushed-up position when the probe 60 moves upward (in the second direction) in the state in which the striking direction of the fastener by the driver blade 23 (first direction) is inclined by a predetermined angle or more with respect to the driving surface.

Hereinafter, the limiting portion 35 of the blade guide 30 will be described in detail. The limiting portion 35 is formed by a part of the blade guide 30. Specifically, the limiting portion 35 is formed by a lower end of the blade guide 30 and protrudes outside (around) the probe 60.

As illustrated in FIG. 6, the limiting portion 35 includes a right limiting portion 35R and a left limiting portion 35L which are provided on both sides of the probe 60 and opposed to each other with the probe 60 interposed therebetween. Furthermore, the size of each of the right limiting portion 35R and the left limiting portion 35L in the front-back direction is larger than the size of the probe 60 in the same direction. More specifically, the right limiting portion 35R is provided on the right side of the probe 60, and the right limiting portion 35R projects to the front and back of the probe 60. Also, the left limiting portion 35L is provided on the left side of the probe and the left limiting portion 35L projects to the front and back of the probe 60. As a result, the limiting portion 35 protrudes to the front, back, left, and right of the probe 60 as a whole.

Next, a function of the limiting portion 35 will be described using a fitting fixing work as an example. In the fitting fixing work mentioned herein, a fitting placed on a workpiece is fixed to the workpiece by a fastener. More specifically, the fitting is fixed to the workpiece by driving the fastener (nail) into the workpiece through a hole provided in the fitting. Therefore, one surface (upper surface) of the workpiece into which the fastener is driven through the hole of the fitting corresponds to a driving surface of the present invention. Also, one surface (upper surface) of the fitting placed on the workpiece is parallel to the upper surface of the workpiece and corresponds to a contacting surface of the present invention. Note that the upper surface of the fitting corresponds to the contacting surface of the present invention as long as it is substantially parallel to the upper surface of the workpiece corresponding to the driving surface.

Figure 10:
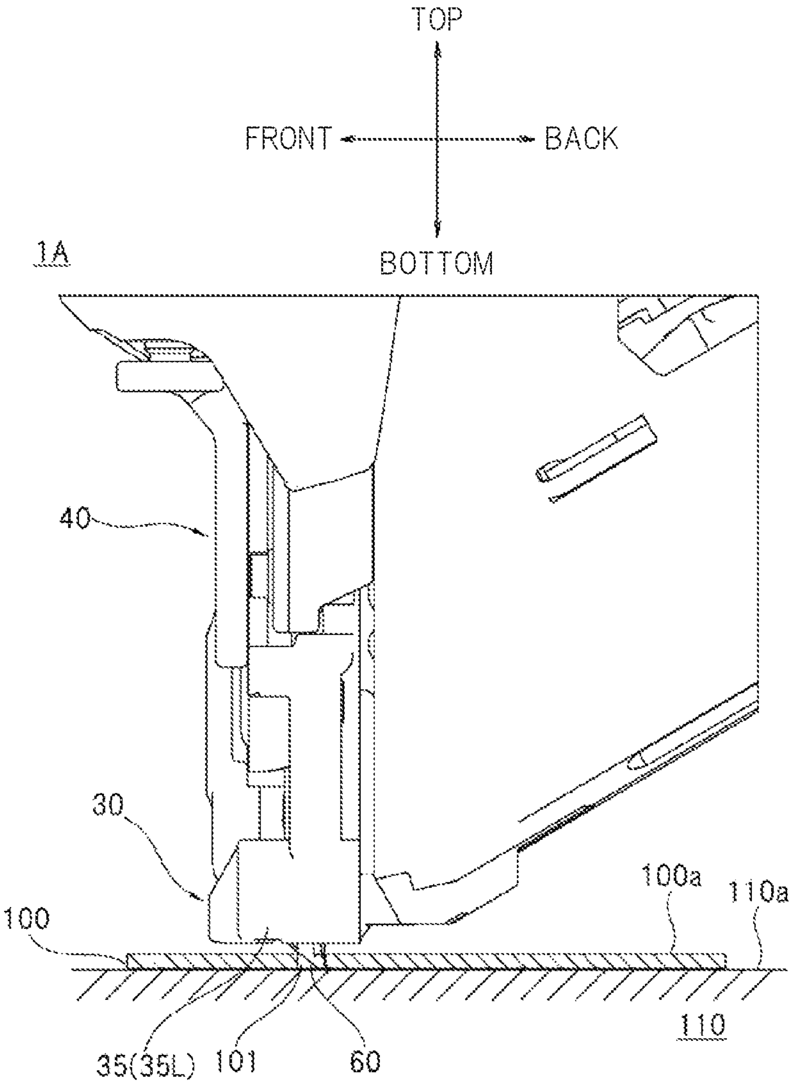
FIG. 10 is an explanatory view illustrating a function of a limiting portion.

Refer to FIG. 10. A fitting 100 illustrated in FIG. 10 is placed on an upper surface (driving surface 110*a*) of a workpiece 110. Also, the driving tool 1A illustrated in FIG. 10 is not inclined with respect to the driving surface 110*a*. Namely, the striking direction of the fastener is not inclined with respect to the driving surface 110*a*. Furthermore, the distal end of the probe 60 is inserted straight into a hole 101 of the fitting 100.

When a worker presses the driving tool 1A toward the workpiece 110, the distal end of the probe 60 is pressed to the driving surface 110*a* inside the hole 101. Then, the push lever including the probe 60 moves upward, and the probe 60 reaches the pushed-up position. From another perspective, the blade guide 30 including the limiting portion 35 moves downward, and the limiting portion 35 approaches an upper surface (contacting surface 100*a*) of the fitting 100.

However, even when the push lever 40 rises until the probe reaches the pushed-up position, the limiting portion 35 does not contact to the contacting surface 100*a*. From another perspective, the probe 60 rises to the pushed-up position before the limiting portion 35 contacts to the contacting surface 100*a*.

Therefore, when the striking direction of the fastener is not inclined with respect to the driving surface 110*a*, the limiting portion 35 does not prevent the probe 60 from reaching the pushed-up position. In other words, the limiting portion 35 does not limit the upward movement amount of the probe 60.

As described above, when the probe 60 reaches the pushed-up position, the driver blade 23 is allowed to strike the fastener. Therefore, the motor 13 is actuated under control of the controller 17 and the driving action is performed if the other conditions (for example, operation of a trigger lever) are satisfied.

Figure 11:
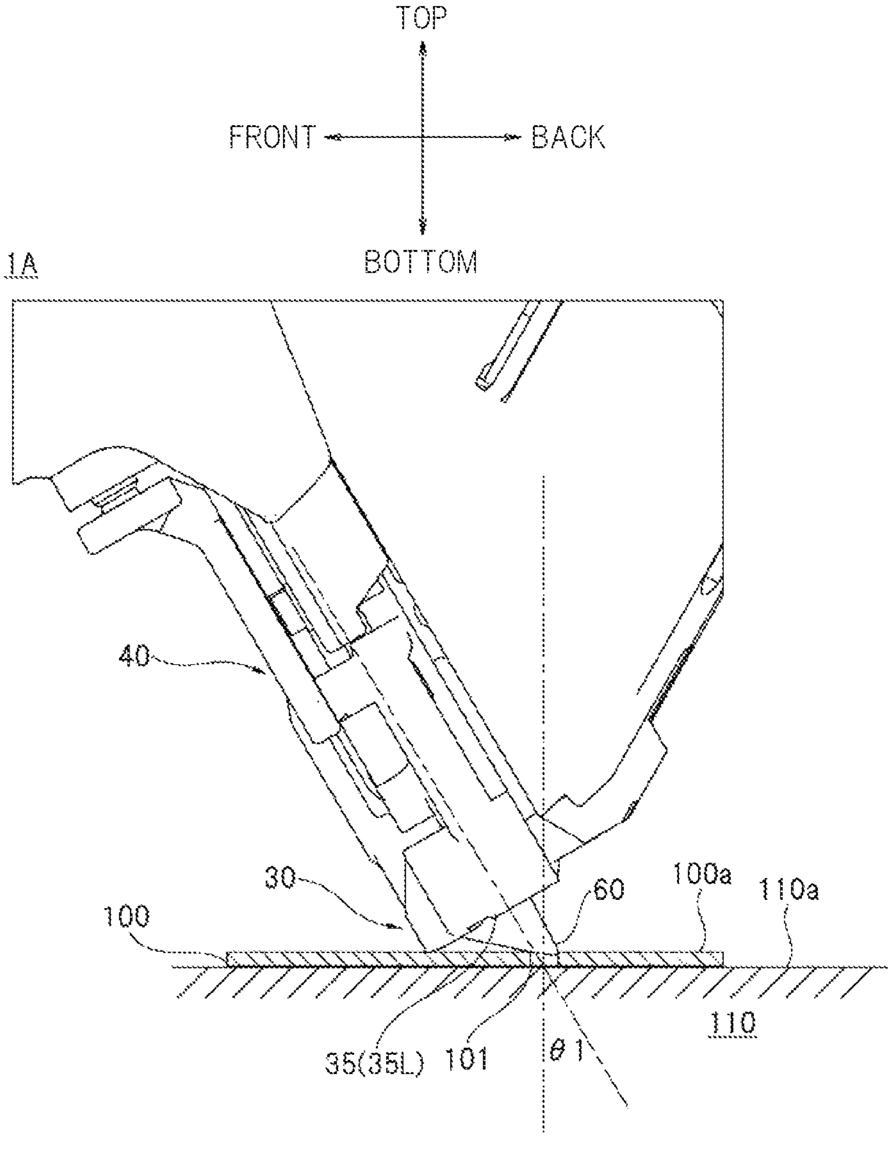
FIG. 11 is another explanatory view illustrating the function of the limiting portion.

Next, refer to FIG. 11. The fitting 100 illustrated in FIG. 11 is placed on the upper surface (driving surface 110*a*) of the workpiece 110 like the fitting 100 illustrated in FIG. 10. On the other hand, the driving tool 1A illustrated in FIG. 11 is inclined with respect to the driving surface 110*a* unlike the driving tool 1A illustrated in FIG. 10. Specifically, the driving tool 1A illustrated in FIG. 11 is inclined by a first predetermined angle (θ1) or more forward when viewed from the worker (inclined forward). Namely, the striking direction of the fastener is inclined by the first predetermined angle (θ1) or more forward when viewed from the worker (inclined forward). Furthermore, along with the forward inclination of the driving tool 1A, the probe 60 is also inclined forward. As a result, the distal end of the probe 60 is not correctly inserted in the hole 101 of the fitting 100, but contacts to the upper surface (the contacting surface 100*a*) of the fitting 100.

When the worker presses the driving tool 1A toward the workpiece 110, the distal end of the probe 60 is pressed to the contacting surface 100*a*. Then, the push lever 40 including the probe 60 moves upward. From another perspective, the blade guide including the limiting portion 35 moves downward, and the limiting portion 35 approaches the contacting surface 100*a*.

However, if the striking direction of the fastener is inclined forward by the first predetermined angle (θ1) or more with respect to the driving surface 110*a*, the limiting portion which is a part of the blade guide 30 contacts to the contacting surface 100*a* before the push lever 40 rises until the probe 60 reaches the pushed-up position. As a result, the push lever 40 including the probe 60 is prevented from further rising.

In other words, when the striking direction of the fastener is inclined forward by the first predetermined angle (θ1) or more with respect to the driving surface 110*a* or the contacting surface 100*a*, the limiting portion 35 limits the upward movement amount of the probe 60 such that the probe 60 does not reach the pushed-up position. Note that the first predetermined angle (θ1) in the present embodiment is 15 degrees. Therefore, when the striking direction of the fastener is inclined forward by 15 degrees or more with respect to the driving surface 110*a* or the like, the probe 60 is prevented from reaching the pushed-up position by the limiting portion 35.

As described above, if the probe 60 does not reach the pushed-up position, the driver blade 23 is not allowed to strike the fastener. Therefore, the driving action is not performed regardless of whether the other conditions (for example, operation of the trigger lever) are satisfied or not. Therefore, occurrence of failure such as the fastener coming out from the hole 101 of the fitting 100 can be prevented in advance.

Figure 12:
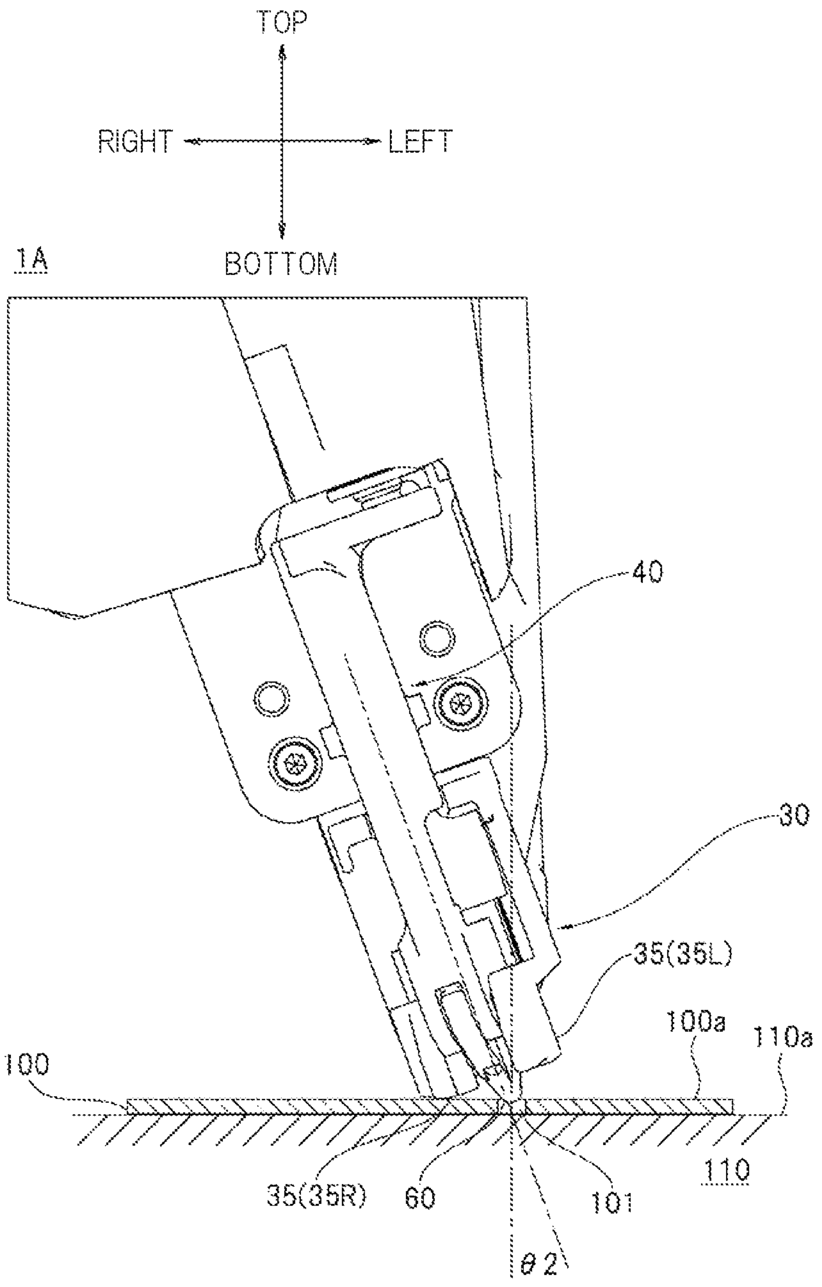
FIG. 12 is another explanatory view illustrating the function of the limiting portion.
Figure 13:
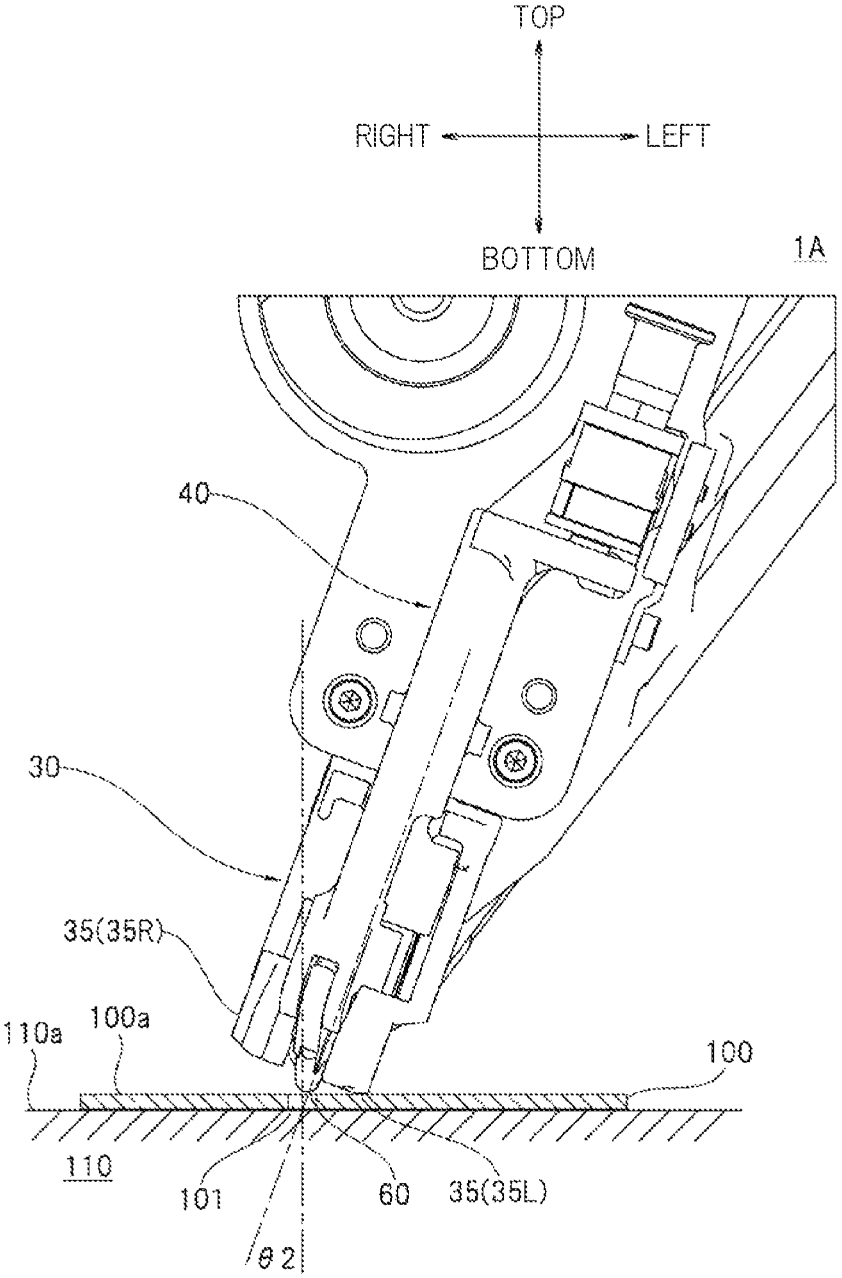
FIG. 13 is another explanatory view illustrating the function of the limiting portion.

Next, refer to FIG. 12 and FIG. 13. The fitting 100 illustrated in FIG. 12 and FIG. 13 is placed on the upper surface (driving surface 110*a*) of the workpiece 110 like the fitting 100 illustrated in FIG. 10. On the other hand, the driving tool 1A illustrated in FIG. 12 and FIG. 13 is inclined with respect to the driving surface 110*a* unlike the driving tool 1A illustrated in FIG. 10.

Specifically, the driving tool 1A illustrated in FIG. 12 is inclined by a second predetermined angle (θ2) or more to the right when viewed from the worker (inclined to the right). Namely, the striking direction of the fastener is inclined by the second predetermined angle (θ2) or more to the right when viewed from the worker (inclined to the right).

On the other hand, the driving tool 1A illustrated in FIG. 13 is inclined by the second predetermined angle (θ2) or more to the left when viewed from the worker (inclined to the left). Namely, the striking direction of the fastener is inclined by the second predetermined angle (θ2) or more to the left when viewed from the worker (inclined to the left).

Note that FIG. 12 and FIG. 13 are partial front views of the driving tool 1A. Therefore, the direction of the inclination of the driving tool 1A when viewed from the worker is opposite to the illustrated direction of the inclination of the driving tool 1A. For example, the driving tool 1A illustrated in FIG. 12 is inclined to the left in the illustration, but is inclined to the right when viewed from the worker.

The probe 60 illustrated in FIG. 12 and FIG. 13 is inclined along with the inclination of the driving tool 1A. As a result, the distal end of the probe 60 is not correctly inserted in the hole 101 of the fitting 100, but contacts to the upper surface (the contacting surface 100*a*) of the fitting 100.

When the worker presses the driving tool 1A toward the workpiece 110, the distal end of the probe 60 is pressed to the contacting surface 100*a*. Then, the push lever 40 including the probe 60 moves upward. From another perspective, the blade guide including the limiting portion 35 moves downward, and the limiting portion 35 approaches the contacting surface 100*a*.

Herein, if the striking direction of the fastener is inclined to the right or inclined to the left by the second predetermined angle (θ2) or more with respect to the driving surface 110*a*, the limiting portion 35 which is a part of the blade guide 30 contacts to the contacting surface 100*a* before the push lever 40 rises until the probe 60 reaches the pushed-up position. As a result, the push lever 40 including the probe is prevented from further rising.

Namely, when the striking direction of the fastener is inclined to the right or inclined to the left by the second predetermined angle (θ2) or more with respect to the driving surface 110*a* or the contacting surface 100*a*, the limiting portion limits the upward movement amount of the probe 60 such that the probe 60 does not reach the pushed-up position. Note that the second predetermined angle (02) in the present embodiment is 25 degrees. Therefore, when the striking direction of the fastener is inclined to the right or inclined to the left by 25 degrees or more with respect to the driving surface 110*a* or the like, the probe 60 is prevented from reaching the pushed-up position by the limiting portion 35.

As described above, if the probe 60 does not reach the pushed-up position, the driver blade 23 is not allowed to strike the fastener. Therefore, the driving action is not performed regardless of whether the other conditions (for example, operation of the trigger lever) are satisfied or not. Therefore, occurrence of failure such as the fastener coming out from the hole 101 of the fitting 100 can be prevented in advance.

Figure 14:
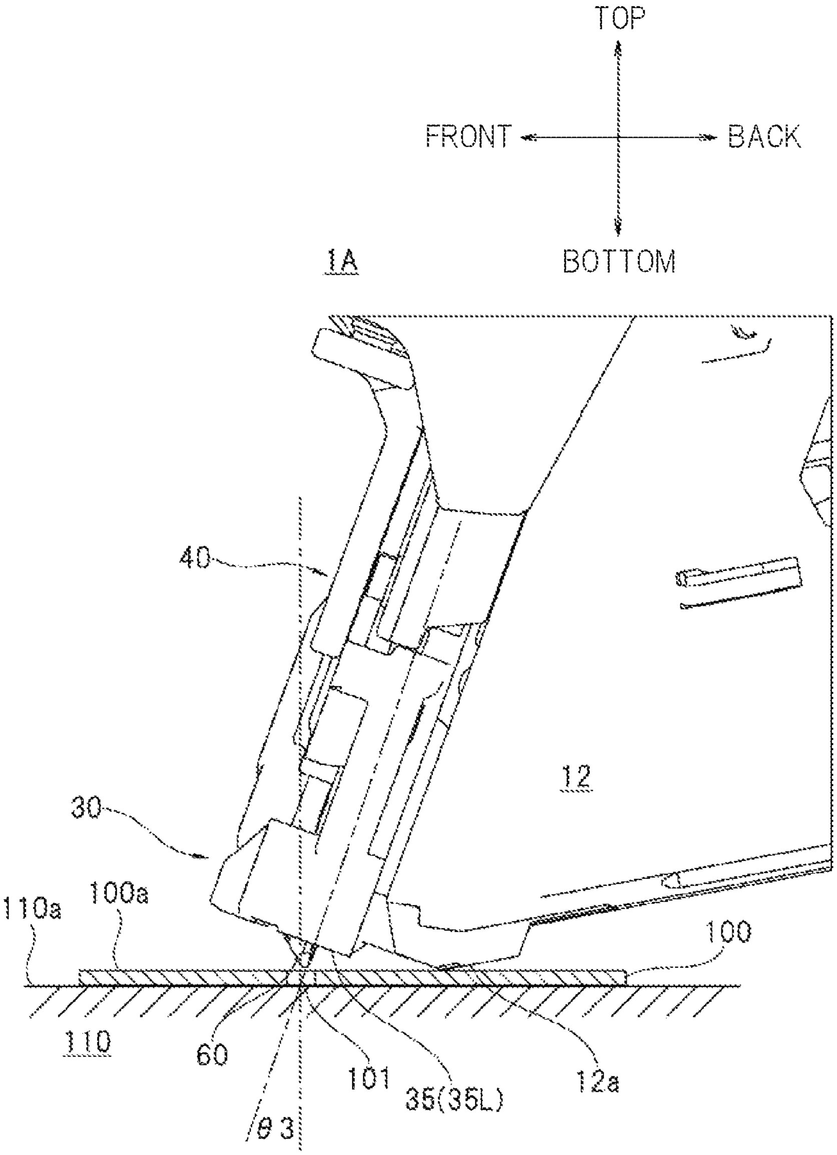
FIG. 14 is another explanatory view illustrating the function of the limiting portion.

Next, refer to FIG. 14. The fitting 100 illustrated in FIG. 14 is placed on the upper surface (driving surface 110*a*) of the workpiece 110 like the fitting 100 illustrated in FIG. 10. On the other hand, the driving tool 1A illustrated in FIG. 14 is inclined with respect to the driving surface 110*a* unlike the driving tool 1A illustrated in FIG. 10. Specifically, the driving tool 1A illustrated in FIG. 14 is inclined by a third predetermined angle (θ3) or more backward when viewed from the worker (inclined backward). Therefore, the striking direction of the fastener is inclined by the third predetermined angle (θ3) or more backward when viewed from the worker (inclined backward).

When the striking direction of the fastener is inclined backward by the third predetermined angle (θ3) or more with respect to the driving surface 110*a* or the contacting surface 100*a*, a lower front end 12*a* of the magazine 12 contacts to the contacting surface 100*a* before the distal end of the probe 60 reaches the hole 101 of the fitting 100 or the upper surface (contacting surface 100*a*) of the fitting 100. As a result, the distal end of the probe 60 is not inserted in the hole 101 of the fitting 100 and does not contact to the contacting surface 100*a*.

Therefore, even when the worker presses the driving tool 1A toward the workpiece 110, the distal end of the probe 60 is not pressed to the driving surface 110*a* and the contacting surface 100*a*. Therefore, the push lever 40 does not move upward, and the probe 60 does not reach the pushed-up position.

Note that the third predetermined angle (θ3) in the present embodiment is 15 degrees. Therefore, when the striking direction of the fastener is inclined backward by 15 degrees or more with respect to the driving surface 110*a* or the like, the probe 60 is prevented from reaching the pushed-up position by the lower front end 12*a* of the magazine 12. Namely, when the driving tool 1A is inclined backward with respect to the driving surface 110*a*, the magazine 12 functions as a second limiting portion.

As described above, when the striking direction of the fastener by the driver blade 23 is inclined forward, inclined to the right, or inclined to the left by the predetermined angle or more with respect to the driving surface 110*a*, the upward movement amount of the probe 60 is limited by the first limiting portion (limiting portion 35), and the probe 60 is prevented from reaching the pushed-up position. Also, when the striking direction of the fastener by the driver blade 23 is inclined backward by the predetermined angle or more with respect to the driving surface 110*a*, the upward movement of the probe 60 is limited by the second limiting portion (magazine 12), and the probe 60 is prevented from reaching the pushed-up position. Namely, when the striking direction of the fastener by the driver blade 23 is inclined by the predetermined angle or more with respect to the driving surface 110*a*, the probe 60 does not reach the pushed-up position, and thus the driving action is not performed.

Note that there is also an embodiment in which the upward movement amount of the probe 60 is limited by the blade guide 30 (limiting portion 35) also when the striking direction of the fastener is inclined backward by the predetermined angle or more with respect to the driving surface 110*a*. This embodiment is realized by, for example, enlarging the protrusion of a lower end of the blade guide, which forms the limiting portion 35, toward the back of the probe.

FIG. 15(*a*) is an enlarged view of the probe 60 of the present embodiment. FIG. 15(*b*) is an enlarged view of the probe of the present embodiment which is inclined laterally by (a) degrees. On the other hand, FIG. 16(*a*) is an enlarged view of a conventional probe 160. Also, FIG. 16(*b*) is an enlarged view of the probe 160 which is inclined laterally by (a) degrees.

As illustrated in FIG. 15(*a*), a distal-end surface 65 of the probe 60 of the present embodiment is approximately circular (spherical) as a whole. Also, a side surface 66 and the distal-end surface 65 of the probe 60 are continuously formed via a tapered surface 67. In other words, the tapered surface 67 is interposed between the side surface 66 and the distal-end surface of the probe 60, one end side (upper side) of the tapered surface 67 is connected to the side surface 66, and the other end side (lower side) of the tapered surface 67 is connected to the distal-end surface 65. In addition, a boundary portion between the tapered surface 67 and the distal-end surface 65 is slightly narrowed. In other words, a neck 68 is formed at the boundary portion between the tapered surface 67 and the distal-end surface 65. Therefore, tangent lines of the distal-end surface 65 do not include a line parallel to the tapered surface 67.

As illustrated in FIG. 16(*a*), the conventional probe 160 is similar to the probe 60 of the present embodiment in that a distal-end surface 165 is approximately circular (spherical) as a whole. On the other hand, the probe 160 is different from the probe 60 in that the neck 68 is not provided. As a result, tangent lines of the distal-end surface 165 include a line parallel to the tapered surface 167.

FIG. 15(*b*) and FIG. 16(*b*) will be compared with each other. When the probes 60 and 160 are inclined in the same direction by the same angle, the deviation amount (t1) of the center of the probe 60 with respect to the center of the hole 101 of the fitting 100 is smaller than the deviation amount (t2) of the center of the probe 160. Therefore, when the probe 60 is inclined with respect to the fitting 100, the probe 60 is less likely to come out from the hole 101 as compared with the probe 160. The difference between the deviation amounts (t1, t2) which exerts this effect is mainly caused by the presence/absence of the neck 68.

The present invention is not limited to the above-described embodiment, but various modifications can be made within the range not departing from the gist thereof. For example, the driving tool 1A according to the above-described embodiment is an electric driving tool provided with the motor 13. However, the present invention can be applied also to working tools other than electric working tools. For example, the present invention can be applied to a pneumatic driving tool. In one aspect of a pneumatic driving tool to which the present invention is applied, a link mechanism which is interlocked with the push lever 40 is provided. When the probe 60 which is a part of the push lever 40 reaches the predetermined position, the link mechanism opens a valve on an airflow path between a compressed-air supply source (for example, air compressor) and the cylinder 20. Then, compressed air is supplied to the cylinder 20, and the piston 21 is moved downward by the pressure of the compressed air. On the other hand, when the probe 60 has not reached the predetermined position, the link mechanism does not open the valve.

In the above-described embodiment, the function of the limiting portion 35 has been described using the case in which the driving tool 1A is inclined to the front, back, left, and right as an example. However, even when the driving tool 1A is inclined in other directions, the limiting portion 35 functions in the same or substantially the same manner as the above description. For example, the limiting portion 35 can limit the movement amount of the probe 60 even when the driving tool 1A is inclined obliquely forward by a predetermined angle or more. In addition, each of the above-described predetermined angles (θ1, θ2, θ3) can be changed as appropriate. As a matter of course, all of the above-described predetermined angles (θ1, θ2, θ3) are preferably set within a range of 10 degrees or more to less than 30 degrees. The change in the angles can be made by changing the size, shape, and others of the limiting portion 35.

REFERENCE SIGNS LIST

1A driving tool
2 cylinder case
4 motor case
6 handle
8 coupling portion
10 housing
12 magazine
12*a* lower front end
13 motor
14 drive shaft
15 speed reduction mechanism
16 battery
17 controller
20 cylinder 21 piston
22 piston upper chamber
23 driver blade
24 damper
25 pinwheel
25*a* pin
26 accumulation chamber
26*a* chamber
30 first blade guide (blade guide)
31 ejection path
32 guide groove
35 limiting portion
35L left limiting portion
35R right limiting portion
40 push lever
41 coil spring
42 detector
43 magnet
44 Hall element
50 push-lever main body (lever main body)
51 guide projection
52 coupling hole
160 probe
61 coupling pin
62 concave groove
165 distal-end surface
66 side surface
67, 167
68 neck
70 nail guide
71 concave groove
100 fitting
100*a* contacting surface
101 hole
110 workpiece
110*a* driving surface
110*a* tapered surface

The invention claimed is:

1. A working tool comprising:
a striking portion configured to strike a fastener in a first direction and drive it into a driving surface;
an ejection portion configured to form an ejection path through which the fastener struck by the striking portion passes; and
a contacting member that is movable with respect to the ejection portion in the first direction and a second direction opposite to the first direction and contacts to the fastener ejected from the ejection path to guide the fastener,
wherein the striking portion is allowed to strike the fastener when the contacting member moving in the second direction reaches a predetermined position,
wherein the contacting member is movable at least between the predetermined position and a projecting position that is apart from the predetermined position in the first direction and projects from the ejection portion, and
wherein the ejection portion is provided with a limiting portion configured to limit a movement amount of the contacting member in the second direction such that the contacting member does not reach the predetermined position when the contacting member moves in the second direction in a state in which the first direction is inclined by a predetermined angle or more with respect to the driving surface.

2. The working tool according to claim 1,
wherein the contacting member is pressed to the driving surface or a contacting surface parallel to the driving surface and moves in the second direction, and
wherein the limiting portion contacts to at least either one of the driving surface and the contacting surface before the contacting member reaches the predetermined position when the contacting member moves in the second direction in the state in which the first direction is inclined by the predetermined angle or more with respect to the driving surface.

3. The working tool according to claim 2,
wherein the limiting portion is provided around the contacting member and protrudes outside the contacting member.

4. The working tool according to claim 3,
wherein the limiting portion protrudes to front, back, left, and right of the contacting member.

5. The working tool according to claim 2,
wherein the limiting portion includes a right limiting portion and a left limiting portion which are provided on both sides of the contacting member and opposed to each other with the contacting member interposed therebetween.

6. The working tool according to claim 1,
wherein the limiting portion is provided at an end of the ejection portion in the first direction.

7. The working tool according to claim 1 comprising:
a push-lever main body movable with respect to the ejection portion in the first direction and the second direction,
wherein the contacting member is provided at an end of the push-lever main body in the first direction and moves integrally with the push-lever main body.

8. The working tool according to claim 1 comprising:
a detector configured to detect that the contacting member moving in the second direction has reached the predetermined position.

* * * * *